(12) United States Patent
Hambloch et al.

(10) Patent No.: US 12,709,327 B2
(45) Date of Patent: Aug. 18, 2026

(54) STEER-BY-WIRE STEERING SYSTEM FOR A VEHICLE AND METHOD FOR PROVIDING HAPTIC FEEDBACK AT THE STEERING HANDLE OF SUCH A STEER-BY-WIRE STEERING SYSTEM

(71) Applicant: ZF Automotive Germany GmbH, Alfdorf (DE)

(72) Inventors: Peter Hambloch, Krefeld (DE); Andreas Kotz, Duisburg (DE); Rene Michels, Grevenbroich (DE); Thomas Schubert, Kelberg (DE)

(73) Assignee: ZF Automotive Germany GmbH, Alfdorf (DE)

( * ) Notice: Subject to any disclaimer, the term of this patent is extended or adjusted under 35 U.S.C. 154(b) by 43 days.

(21) Appl. No.: 18/486,278

(22) Filed: Oct. 13, 2023

(65) Prior Publication Data

US 2024/0124057 A1 Apr. 18, 2024

(30) Foreign Application Priority Data

Oct. 14, 2022 (DE) ........................ 102022210847.7

(51) Int. Cl.
*B62D 6/00* (2006.01)
*B62D 15/02* (2006.01)

(52) U.S. Cl.
CPC ........... *B62D 6/008* (2013.01); *B62D 15/022* (2013.01)

(58) Field of Classification Search
CPC ...... B62D 6/008; B62D 15/022; B62D 5/005; B62D 5/006; B62D 5/0403; B62D 5/0409; B62D 5/001
USPC ........................................................... 701/42
See application file for complete search history.

(56) References Cited

U.S. PATENT DOCUMENTS

2010/0211263 A1* 8/2010 Lindenstruth ........ B62D 5/0472 701/41
2013/0138296 A1* 5/2013 Kouchi .................... B62D 6/00 701/41
2019/0118853 A1* 4/2019 Delmarco .............. B62D 5/006
2022/0135121 A1* 5/2022 John ...................... B62D 6/008 701/32.9
2022/0379961 A1* 12/2022 Malacci ................... B62D 3/12

FOREIGN PATENT DOCUMENTS

DE 102010021561 A1 12/2011
DE 102018126337 A1 4/2020
JP 2006182052 A * 7/2006 ............... B62D 5/04
WO 2017102387 A1 6/2017

* cited by examiner

*Primary Examiner* — Xiao En Mo
(74) *Attorney, Agent, or Firm* — Kristin L. Murphy

(57) ABSTRACT

The disclosure relates to a steer-by-wire steering system for a vehicle and with a steering device, the steering device having a manual steering handle, a steering sensor system and a feedback actuator, and with a wheel positioning device, the wheel positioning device having a positioning actuator for steering at least one wheel, and with at least one control device, the control device electrically connecting the steering device and the wheel positioning device to one another, and with at least one acceleration sensor, the feedback actuator and the acceleration data acquired by the acceleration sensor being used to provide haptic feedback at the steering handle.

14 Claims, 2 Drawing Sheets

STEER-BY-WIRE STEERING SYSTEM FOR A VEHICLE AND METHOD FOR PROVIDING HAPTIC FEEDBACK AT THE STEERING HANDLE OF SUCH A STEER-BY-WIRE STEERING SYSTEM

CROSS-REFERENCE TO RELATED APPLICATION

This application claims priority to German Priority Application No. 102022210847.7, filed Oct. 14, 2022, the disclosure of which is incorporated herein by reference in its entirety.

TECHNICAL FIELD

The disclosure relates to a steer-by-wire steering system for a vehicle and with a steering device, the steering device having a manual steering handle, a steering sensor system and a feedback actuator, and with a wheel positioning device, the wheel positioning device having a positioning actuator for steering at least one wheel, and with at least one control device, the control device electrically connecting the steering device and the wheel positioning device to one another, and with at least one acceleration sensor, the feedback actuator and the acceleration data acquired by the acceleration sensor being used to provide haptic feedback at the steering handle. Moreover, the disclosure relates to a method for providing haptic feedback at the steering handle of such a steer-by-wire steering system.

BACKGROUND

Acceleration data from an acceleration sensor can be used, inter alia, as a basis for implementing haptic signaling at the steering handle. The haptic signaling may comprise a vibration and/or a brief application of force, for example a torque at the manual steering wheel handle. The haptic signaling may be contingent on unevennesses of a road that is being driven on by the vehicle. The driver can thus receive, via the steering handle, feedback relating to a road condition and the driving behavior of the vehicle. With regard to the acceleration sensor, this document only describes that it is an acceleration sensor of the vehicle.

In principle, it is additionally known that vehicles may comprise an acceleration sensor. Such an acceleration sensor that is already present could thus be used to provide haptic feedback at the steering handle. However, this assumes that a suitable acceleration sensor is actually already installed in the vehicle. Depending on the specific installation situation of the acceleration sensor in the vehicle, however, there is the risk of the forces and/or accelerations acting on the wheel and/or in the chassis of the vehicle, in particular introduced by the road, not being able to be detected with a sufficient quality and/or speed for providing the haptic feedback at the steering handle.

SUMMARY

The steer-by-wire steering system is designed for a vehicle, in particular a motor vehicle. The vehicle comprises the steer-by-wire steering system. The steer-by-wire steering system has a steering device, a wheel positioning device and a control device. The steer-by-wire steering system is in particular designed to forward a steering command from the steering device to the wheel positioning device exclusively electrically, such as by the control device. In a steer-by-wire steering system, there is thus no mechanical connection between the steering device and the wheel positioning device.

In this case, the steering device has a manual steering handle, a steering sensor system and a feedback actuator. The feedback actuator may be designed as an electric motor or have an electric motor. The steering handle may be designed as a steering wheel. In the scope of the present application, the term "steering handle" is in particular representative of every possible form and design of a steering handle or of a control device for manually steering the vehicle. The steering handle can be manually operable by a driver of the vehicle. The steering sensor system may have a rotational angle sensor and/or a torque sensor in order to detect the rotational position, a rotational angle and/or a rotational angle acceleration of the steering handle and/or a force acting on the steering handle or a torque acting on the steering handle.

The wheel positioning device has a positioning actuator for steering at least one wheel. In particular, the positioning actuator is designed as an electric motor or has an electric motor. The wheel positioning device may have a steering gear and/or a toothed rack. A separate wheel positioning device can be assigned to each wheel of a front axle and/or of a rear axle of the vehicle for steering the respective wheel. In another exemplary arrangement, a front axle and/or a rear axle of the vehicle may have a wheel positioning device for simultaneously steering two wheels. For example, the wheel positioning device is designed to steer two front wheels of a front axle of the vehicle. Alternatively or in addition, a wheel positioning device, in particular a further wheel positioning device, may be designed to steer two rear wheels of a rear axle of the vehicle.

Moreover, the steer-by-wire steering system has at least one control device. In particular, the at least one control device is designed as an electrical control device. The control device can be arranged between the steering device and the wheel positioning device. The control device electrically connects the steering device and the wheel positioning device to one another. For this purpose, electrical lines and/or data lines can connect the steering device to the control device and/or the wheel positioning device to the control device. In particular, the control device is used to process data from the steering device and/or from the wheel positioning device. The control device can be used to route signals to the wheel positioning device, in particular the positioning actuator, and/or to the steering device, in particular the feedback actuator. The steer-by-wire steering system can have a single control device which electrically connects the steering device and the wheel positioning device to one another. The data from the steering device and from the wheel positioning device can thus be processed in a single control device which is in particular arranged between the steering device and the wheel positioning device. In another exemplary arrangement, the steer-by-wire steering system may have a first control device and at least one further control device. In this case, the first control device is assigned to the steering device and the further control device is assigned to the wheel positioning device. These two control devices are electrically connected to one another, such as by a bus system.

At least one acceleration sensor is additionally provided. The acceleration sensor can be used to acquire acceleration data from a component which is connected to the acceleration sensor. Haptic feedback is thus provided at the steering handle on the basis of the acquired acceleration data by the feedback actuator.

According to the disclosure, the acceleration sensor is arranged in or on the wheel positioning device.

In this case, it is advantageous that, by virtue of the acceleration sensor in or on the wheel positioning device, the forces and/or accelerations acting on the wheel and/or in the chassis of the vehicle, in particular introduced by the road, can be detected and/or processed with a sufficient quality and/or speed for providing the haptic feedback at the steering handle. As a result, the provision of data for haptic feedback at the steering handle with respect to a road condition and/or driving behavior of the vehicle can be improved.

In particular, haptic feedback is understood to mean a change and/or adaptation to steering torque at the steering handle. The haptic feedback can arise due to a differential position of the steering handle. In this context, a differential position can be understood to mean a change and/or adaptation to the position of the steering handle, in particular with respect to a steering angle. Additionally, within the scope of the haptic feedback, the steering handle can be overlaid with a predefined vibration pattern and/or frequency content. As a result, a state of the road, for example, can be communicated to the driver via the steering handle.

In addition to the haptic feedback, a visual and/or audible signal may be provided and/or generated. By way of this signal, additional feedback can be provided to the driver of the vehicle. In an autonomous driving mode of the vehicle, the feedback may be limited to purely visual and/or audible feedback.

The acceleration sensor can be arranged inside a housing of the wheel positioning device. The housing in particular shields the acceleration sensor from environmental influences, moisture and/or dirt. The housing may be designed as a closed housing. As a result, it can be ensured that no moisture or dirt particles can penetrate into the housing and damage the acceleration sensor. Via the housing, which encloses the acceleration sensor, the acceleration sensor is effectively protected from external influences. In particular, the acceleration sensor is arranged inside a housing of the wheel positioning device, which housing is usually already present. A housing, which is already present, of the wheel positioning device can thus be used for arranging the acceleration sensor. An additional or separate housing for the acceleration sensor can thus be dispensed with for the benefit of a compact construction and economical production.

The housing inside which the acceleration sensor is arranged may be designed as a positioning actuator housing of the positioning actuator. The acceleration sensor is thus arranged inside the positioning actuator housing. The positioning actuator usually already has a positioning actuator housing for accommodating a drive or electric motor. A positioning actuator housing which is usually already present can thus be used and/or adapted to accommodate the at least one acceleration sensor in the positioning actuator housing.

According to a further arrangement, the wheel positioning device and/or the positioning actuator have/has an electrical or electronic control unit. The control unit can be used to control the wheel positioning device or the positioning actuator. In this arrangement, the control unit of the wheel positioning device and/or of the positioning actuator comprises the acceleration sensor. The acceleration sensor may thus be designed as a constituent part of a control unit, which control unit is in particular usually already present. In another exemplary arrangement, the control unit may be designated or designed as a controller or as an ECU (Electronic Control Unit).

According to a further arrangement, the control unit has a printed circuit board, the acceleration sensor being fastened to the printed circuit board. A printed circuit board is usually already a constituent part of a or the control unit for the wheel positioning device and/or the positioning actuator. The acceleration sensor can thus be arranged on a printed circuit board which is usually already present, and can be electrically and/or electronically connected thereto. In particular, the printed circuit board is a carrier for electronic components. The printed circuit board may also be designated as a circuit board or board. Arranging the acceleration sensor on the printed circuit board of the control unit, in particular of the positioning actuator, allows the additional installation space for integrating the acceleration sensor to be reduced to a minimum. In addition, transmission paths for transmitting the acquired acceleration data can consequently be shortened, as a result of which the speed of the data processing can be increased.

In particular, the acceleration sensor is designed to detect accelerations of the wheel positioning device and/or of the positioning actuator in at least one spatial direction and/or vehicle axis direction, in particular in all three spatial directions and/or vehicle axis directions. In particular, the vehicle axis direction is one of the three of, or the three vehicle axis directions are the three of, vehicle longitudinal axis, vehicle transverse axis and vehicle vertical axis which are perpendicular to each other.

According to a further arrangement, the control device is assigned to the steering device or to the wheel positioning device. In this case, the control device may be designed as a constituent part of the steering device or as a constituent part of the wheel positioning device. A spatially separate design of the control device can thus be dispensed with. As a result, it is possible to achieve a particularly compact or space-saving implementation of the steer-by-wire steering system according to the disclosure. The control unit of the wheel positioning device and/or of the positioning actuator can be designed as a constituent part of the control device. The control unit which controls the wheel positioning device and/or the wheel positioning actuator can thus be combined with the control device which connects the steering device and the wheel positioning device to one another and processes data or signals.

In particular, the control device is used to process the acceleration data acquired by the acceleration sensor. In this case, the feedback actuator is able to be controlled on the basis of the data processing and for the purpose of generating haptic feedback at the steering handle with respect to existing force ratios and/or torques between a road surface and the steered wheel.

Particularly advantageous is a method for providing haptic feedback at the steering handle of a steer-by-wire steering system according to the disclosure, the acceleration data for generating the haptic feedback with respect to a dynamic transmission of force and torque between a road surface and the steered wheel being acquired by the acceleration sensor arranged in or on the wheel positioning device.

In this case, the control device can perform a corresponding data processing of the acquired acceleration data. The data processing may comprise converting and/or combining data, in particular of different types. In particular, in the scope of the data processing, the acceleration data and/or a data signal may be filtered, in particular bandpass filtered. The data processing may take into account further data provided by the vehicle and/or by the steer-by-wire steering system. In particular, a torque detected at the steering handle, an estimated torque or a detected rotational angle acceleration may be taken into account. A detected or estimated position at the steering device, in particular the steering handle, and/or at the wheel positioning device may be taken into account. The data processing can take into account a time derivative of the position of the steering device and/or of the wheel positioning device and/or a transverse acceleration and/or a toothed-rack force that is proportional to the transverse acceleration. Moreover, a vehicle speed may be detected and likewise taken into account in the scope of the data processing. The data processing may contain signal processing, in particular model-based signal processing, of at least one acceleration signal or of a plurality of acceleration signals. In this case, the model-based signal processing may be designed in line with control engineering. The haptics of the haptic feedback may be adjusted or adapted on the basis of the data processing, it being possible in particular to adapt an angle and/or torque at the steering handle. Such an adjustment or adaptation of the haptic feedback can take place according to the principle of dynamic reference-variable feedforward of a multi-degree-of-freedom control system.

The method can be developed in accordance with the configurations explained in combination with the steer-by-wire steering system according to the disclosure described here. Moreover, the steer-by-wire steering system may be developed by the configurations explained in combination with the method.

BRIEF DESCRIPTION OF DRAWINGS

The disclosure will be explained in more detail below with reference to the figures. In this respect, the same reference signs relate to components or elements that are the same, similar or have the same function. In the figures.

DETAILED DESCRIPTION

Figure 1:
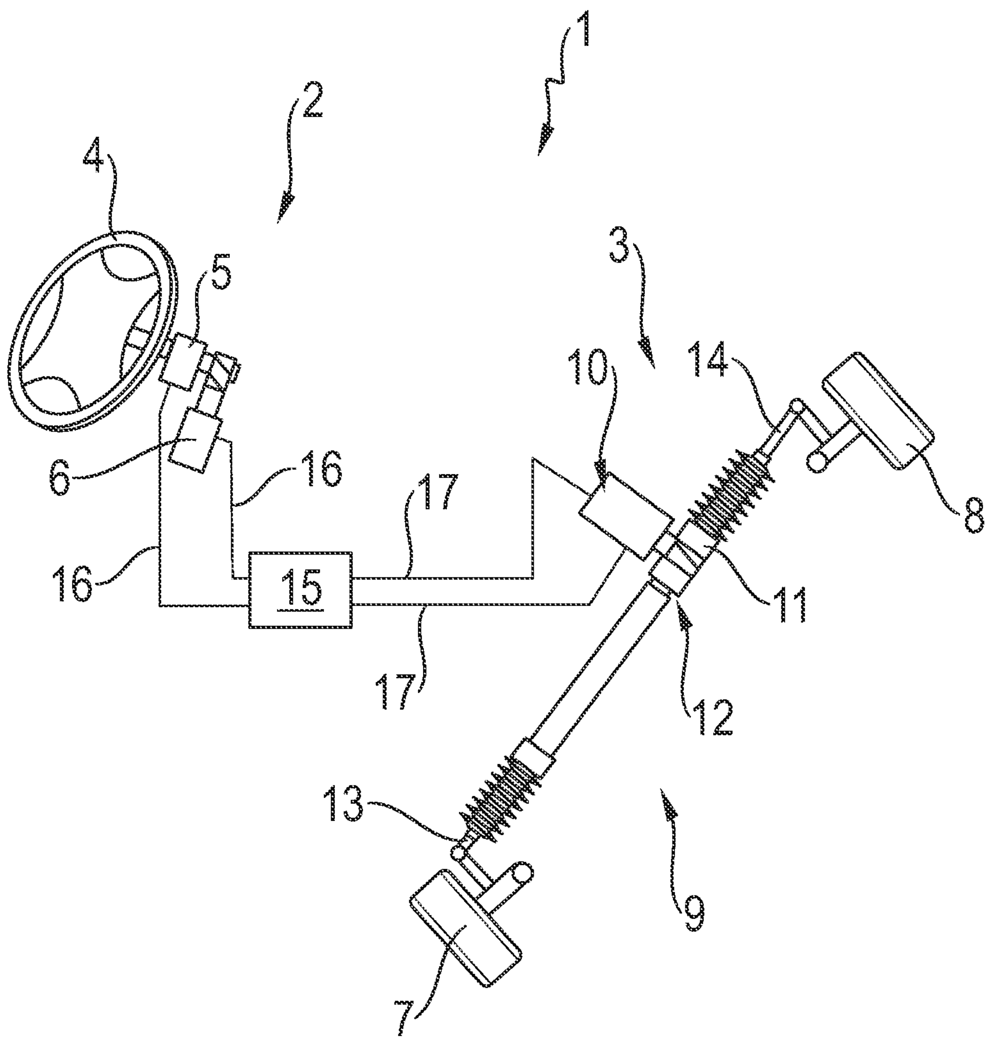
FIG. 1 shows a schematic illustration of a steer-by-wire steering system according to the disclosure.

FIG. 1 shows a schematic illustration of a steer-by-wire steering system 1 according to the disclosure. The steer-by-wire steering system 1 is designed for a motor vehicle (not illustrated in more detail here). For this purpose, the steer-by-wire steering system 1 has a steering device 2 and a wheel positioning device 3.

The steering device 2 has a manually operable steering handle 4. Here, the steering handle 4 is designed as a steering wheel for example. Moreover, in this exemplary arrangement, the steering device 2 has a steering sensor system 5 and a feedback actuator 6. Here, by way of example, the steering sensor system 5 has a rotational angle sensor (not illustrated in more detail here) and a torque sensor. As a result, the steering sensor system 5 can be used to detect a rotational position, a rotational acceleration of the steering handle 4 and a torque acting on the steering handle 4. The feedback actuator 6 has an electric motor (not illustrated in more detail here) which can be used to transmit a torque to the steering handle 4 for providing haptic feedback.

In this exemplary arrangement, the wheel positioning device 3 is designed to steer two wheels 7, 8 of a front axle 9. For this purpose, the wheel positioning device 3 has a positioning actuator 10. In this exemplary arrangement, the positioning actuator 10 is connected to a toothed rack 12 by a steering gear 11. The toothed rack 12 is connected to each wheel 7 and 8 by tie rods 13, 14, respectively.

Moreover, the steer-by-wire steering system 1 has a control device 15. The control device 15 is arranged between the steering device 2 and the wheel positioning device 3. In this exemplary arrangement, the steering device 2 and the wheel positioning device 3 are not connected to one another mechanically but rather are connected to one another exclusively electrically via the control device 15. For this purpose, the control device 15 is connected, on the one hand, to the steering device 2 by electrical lines 16 and, on the other hand, to the wheel positioning device 3 by electrical lines 17. The control device 15 is designed as a single component here. In another exemplary arrangement, the control device 15 may be designed in multiple parts or it may be the case that a first control device (not illustrated in more detail here) is assigned to the steering device 2 and a further control device is assigned to the wheel positioning device 3, these two control devices being electrically connected to one another, for example by a bus system.

Figure 2:
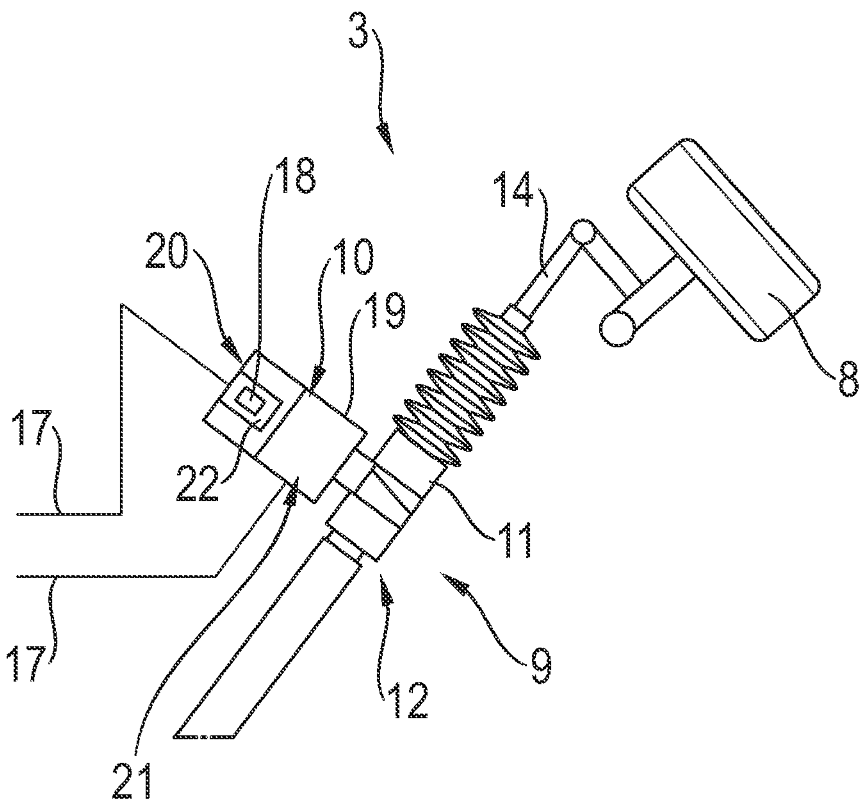
FIG. 2 shows a detail of the schematic illustration of the steer-by-wire steering system according to the disclosure as shown in FIG. 1.

FIG. 2 shows a detail of the schematic illustration of the steer-by-wire steering system 1 according to the disclosure as shown in FIG. 1. The wheel positioning device 3 with the positioning actuator 10 can be seen. The steer-by-wire steering system 1 as shown in FIG. 1 accordingly has an acceleration sensor 18.

As can be seen in FIG. 2 illustrated here, the acceleration sensor 18 is assigned to the wheel positioning device 3. According to this exemplary arrangement, the acceleration sensor 18 is assigned to the positioning actuator 10. The positioning actuator 10 has a housing 19 which is therefore designed as a positioning actuator housing. The acceleration sensor 18 is arranged inside this housing 19, as a result of which it is protected from environmental influences, moisture and/or dirt. For this purpose, the housing 19 is designed as a closed housing 19. In other words, the acceleration sensor 18 is arranged such that it is enclosed in the housing 19.

The positioning actuator 10 additionally has an electronic control unit 20. The control unit 20 is used to control an electric motor 21 (not illustrated in more detail here) of the positioning actuator 10. In this example, the positioning actuator 10 or the electric motor 21 drives the toothed rack 12 via the steering gear 11 in order to steer the wheels 7, 8. In this exemplary arrangement, both the control unit 20 and the electric motor 21 are arranged inside the housing 19. Moreover, the control unit 20 comprises the acceleration sensor 18.

In this exemplary arrangement, the control unit 20 has a printed circuit board 22, the acceleration sensor 18 being fastened to the printed circuit board 22. In this case, the acceleration sensor 18 is designed to detect accelerations in all three vehicle axis directions, namely in the direction of the vehicle longitudinal axis, the vehicle transverse axis and the vehicle vertical axis.

The acceleration data acquired by the acceleration sensor 18 are routed from the control unit 20 to the control device 15 by the line 17 and further processed by the control device 15. On the basis of this data processing and by the feedback actuator 6 of the steering device 2 as shown in FIG. 1, the control device 15 controls haptic feedback to a driver by way of the steering handle 4 with respect to existing force ratios and/or torques between a road surface (not illustrated in more detail here) and the steered wheels 7, 8.

The invention claimed is:

1. A steer-by-wire steering system for a vehicle, comprising:

a steering device having a manual steering handle, a steering sensor system, and a feedback actuator, a wheel positioning device having a positioning actuator for steering at least one wheel, at least one control device electrically connecting the steering device and the wheel positioning device to one another, wherein steering commands from the steering device to the wheel positioning device are exclusively provided electrically by the at least one control device, and at least one acceleration sensor, wherein the feedback actuator and acceleration data acquired by the acceleration sensor are used to provide haptic feedback at the steering handle, wherein the acceleration sensor is arranged inside of a housing of the wheel positioning device is mechanically coupled to the positioning actuator so as to directly detect accelerations introduced by road-wheel interaction, and wherein the control device processes the acceleration data to generate the haptic feedback as a function of existing force ratios between a road surface and the steered wheel.

2. The steer-by-wire steering system as claimed in claim 1, wherein the housing is designed as a positioning actuator housing of the positioning actuator and the acceleration sensor is arranged inside the positioning actuator housing.

3. The steer-by-wire steering system as claimed in claim 1, wherein the wheel positioning device and/or the positioning actuator have/has an electrical or electronic control unit, the control unit having the acceleration sensor.

4. The steer-by-wire steering system as claimed in claim 3, wherein the control unit has a printed circuit board, the acceleration sensor being fastened to the printed circuit board.

5. The steer-by-wire steering system as claimed in claim 1, wherein the acceleration sensor is designed to detect accelerations of the wheel positioning device and/or of the positioning actuator in at least one spatial direction and/or vehicle axis direction.

6. The steer-by-wire steering system as claimed in claim 1, wherein the control device is assigned to the steering device or to the wheel positioning device, the control device designed as a constituent part of the steering device or of the wheel positioning device, the control unit of the wheel positioning device and/or of the positioning actuator designed as a constituent part of the control device.

7. The steer-by-wire steering system as claimed in claim 1, wherein the control device processes the acceleration data acquired by the acceleration sensor, the feedback actuator controlled based on data processing and configured to generate haptic feedback at the steering handle with respect to existing force ratios between a road surface and the steered wheel.

8. A method for providing haptic feedback at the steering handle of a steer-by-wire steering system as claimed in claim 1, wherein the acceleration data for generating the haptic feedback with respect to a dynamic transmission of force and torque between a road surface and the steered wheel are acquired the acceleration sensor arranged in or on the wheel positioning device.

9. A steer-by-wire steering system for a vehicle, comprising a steering device having a steering handle, a steering sensor system, and a feedback actuator, a wheel positioning device having a position actuator for steering at least one wheel, at least one control device electrically connecting the steering device and the wheel positioning device, wherein steering commands from the steering device to the wheel positioning device are exclusively provided electrically, and at least one acceleration sensor, wherein the feedback actuator and acceleration data acquired by the acceleration sensor is used to provide haptic feedback at the steering handle, wherein the acceleration sensor is arranged inside a housing of the wheel positioning device and mechanically coupled to the positioning actuator, and wherein the control device processes the acceleration data to generate haptic feedback representing force ratios between the road surface and the steered wheel.

10. The steer-by-wire steering system as claimed in claim 9, wherein the housing is designed as a positioning actuator housing of the positioning actuator and the acceleration sensor is arranged inside the positioning actuator housing.

11. The steer-by-wire steering system as claimed in claim 9, wherein the wheel positioning device and/or the positioning actuator have/has an electrical or electronic control unit, the control unit having the acceleration sensor.

12. The steer-by-wire steering system as claimed in claim 11, wherein the control unit has a printed circuit board, the acceleration sensor being fastened to the printed circuit board.

13. The steer-by-wire steering system as claimed in claim 9, wherein the acceleration sensor is designed to detect accelerations of the wheel positioning device and/or of the positioning actuator in at least one spatial direction and/or vehicle axis direction.

14. The steer-by-wire steering system as claimed in claim 9, wherein the control device is assigned to the steering device or to the wheel positioning device, the control device designed as a constituent part of the steering device or of the wheel positioning device, the control unit of the wheel positioning device and/or of the positioning actuator designed as a constituent part of the control device.

* * * * *